Jan. 3, 1939. F. KOPPELMANN ET AL Re. 20,962

CIRCUIT INTERRUPTER

Original Filed Jan. 23, 1931 2 Sheets-Sheet 1

WITNESSES:
Leon M. Garman
Walter E. Mueller

INVENTORS
Floris Koppelmann,
Werner Kaufmann,
and Fritz Kesselring
BY
Ralph H. Swingle
ATTORNEY Jan. 3, 1939. F. KOPPELMANN ET AL Re. 20,962

CIRCUIT INTERRUPTER

Original Filed Jan. 23, 1934 2 Sheets-Sheet 2

WITNESSES:
Leon M. Garman
Walter E. Mueller

INVENTORS.
Floris Koppelmann, Werner Kaufmann and Fritz Kesselring.
BY
Ralph W. Swingle
ATTORNEY Reissued Jan. 3, 1939

Re. 20,962

UNITED STATES PATENT OFFICE 20,962

CIRCUIT INTERRUPTER

Floris Koppelmann and Werner Kaufmann, Berlin-Siemensstadt, and Fritz Kesselring, Berlin-Frohnau, Germany, assignors to Westinghouse Electric & Manufacturing Company, East Pittsburgh, Pa., a corporation of Pennsylvania Original No. 2,061,945, dated November 24, 1936, Serial No. 707,928, January 23, 1934. Application for reissue February 11, 1938, Serial No. 190,058. In Germany January 23, 1933

15 Claims. (Cl. 200—150)

Our invention relates to devices for extinguishing the arcs which are formed incident to the opening of alternating-current electrical circuits by switches, fuses or other circuit-interrupting devices, and is particularly applicable to the structures of this type which utilize a liquid as the arc extinguishing means.

Circuit interrupting devices utilizing liquid or gaseous substances for effecting arc extinction have been known in the art for some time. In most of these structures, however, the jet of liquid or gas which effects the extinguishment of the arc is not controlled to the best possible advantage, and even if the jet is produced by such refined structures as the well known blowout nozzle of the heavy-duty compressed air switch, an appreciable amount of the arc extinguishing fluid is not utilized at all effectively.

In some of the known fluid type arc extinguishing devices, the arc is drawn within a narrow, oil-filled channel or chamber, which is provided with a vent opening at one end thereof, through which opening one of the cooperating contacts is adapted to move. Upon the separation of the contacts, an arc is established within the arc chamber, and a considerable quantity of the fluid contained therein is volatilized. This volatile fluid, in venting, flows outwardly through the open end of the arc passage with an expulsive or blast action and thereby extinguishes the arc.

To improve the operation of these devices, it has been proposed to provide further fluid moving means for assuring an adequate blast of arc extinguishing fluid through the arc at all times, the pressure for forcing this additional quantity of liquid through the arc being preferably produced by the arc itself. More specifically, a portion of the arc, which portion is drawn within the main arc extinguishing chamber or within a separate pressure chamber connecting with the main arc chamber, is utilized. This separate pressure chamber, if this means is used, communicates with the outer atmosphere only through the arc passage itself, and while during the normal operation of such devices, a greater amount of fluid is caused to flow through the arc passage, a large proportion of this fluid is in the heated gaseous state, with the result that the arc extinguishing operation takes place much less efficiently than would be the case were liquid alone forced through the arc. Furthermore, the considerable quantity of liquid which is disposed intermediate the pressure producing arc and the arc extinguishing passage proper prevents the rapid expansion of the gas formed therein and delays the arc extinguishing operation.

Substantially the same conditions are present in all known switches and fuses, wherein a portion of the arc, which is drawn through the arc passage, exists in a separate closed chamber filled with liquid, the separate chamber communicating with the atmosphere only through the arc passage.

According to the present invention, the arc is drawn within a narrow arc passage, which is filled with a flowing stream of arc extinguishing liquid, under pressure, for effecting the extinction of the arc during the operation of the device. The novel feature of the present invention lies in the fact that the supply of arc extinguishing liquid is effected during the circuit opening operation by an external pressure force of a given magnitude, this force being entirely independent of the arc, and in the fact that the arc passage opens at either end into suitable expansion chambers, which are at atmospheric pressure or less.

By this arrangement, it is possible to replace continuously the gases in the immediate neighborhood of the arc stream by cool arc extinguishing liquid, which substance has a very high heating capacity per unit volume. And since the pressure of the arc extinguishing liquid is independent of the arc magnitude, the liquid surrounding the arc is capable of counteracting the internal pressure of the arc stream at all times.

The expansion chambers, into which the ends of the arc passage open, permit the free expansion of the gases expelled from the arc passage, and are so proportioned that they do not cause any substantial increase in the pressure, which is required to force the arc extinguishing fluid through that passage. The expansion chambers must, consequently, be of considerable size and normally free of liquid. Preferably, the means which defines the walls of the arc passage is arranged in a chamber free of liquid, except during the circuit opening operation, the pressure of the fluid moving means being thereby minimized.

The magnitude of the pressure force which moves the arc extinguishing fluid through the arc passage is such that the liquid surrounding the arc is caused to follow the decreasing cross-section of the arc along the entire length of the arc passage, without delay, when the alternating-current wave approaches its zero value. The pressure must also, of course, be sufficiently large to assure that the arc extinguishing passage shall be filled with liquid within a very short interval of time following the establishment of an arc therein. We have found that pressures of 2 to 20 atmospheres are necessary for effecting a most efficient operation of our invention, the magnitude of the pressures depending upon the design of the arc passage, the size of the supply conduit for the arc extinguishing liquid, and the current magnitude of the arc.

Low pressures are satisfactory under the more favorable expansion conditions, since then the pressure supplied to the arc extinguishing fluid need only be sufficiently large to overcome the normal pressure existing within the arc stream. Similarly, low pressures are satisfactory when small quantities of liquid have to be moved into and accelerated along the arc passage. We have found that the best arrangement comprises an arc extinguishing passage of small cross-sectional area in combination with a low loss conduit and a particular liquid container especially designed for cooperating therewith, the liquid being forced into the arc passage by compressed air or similar means.

The effectiveness of the arc extinguishing action of our invention depends upon the length of the portion of arc which comes into intimate contact with the surrounding stream of liquid. It is, therefore, essential for the successful accomplishment of our invention that the arc passage shall be filled with liquid under pressure during the entire circuit opening operation, and that the passage shall have a predetermined minimum length, depending upon the operating voltage and the possible magnitude of the current to be interrupted, the length being calculable on the basis of experimentally obtained values of arc extinguishing capacity per unit length of the device. The channel must not be too short, since the arc extinguishing liquid vents freely at the open ends of the arc passage, and sufficient pressure for effecting the contraction of the fluid arc stream is available only adjacent the central portion. Likewise, the channel must not be too long, since the thickness of the gas column flowing in an axial direction through the arc passage during the circuit opening operation increases from the center towards the end of the channel, and after a predetermined length has been excited, the temperature of the flowing gas stream so nearly approaches the temperature of the arc that no substantial cooling action is effected.

The arc extinguishing device of our invention may be operated with practically any insulating liquid, and may be satisfactorily operated with semi-conducting liquids, such as water, since the arc extinguishing effect is not, primarily, a result of the insulating properties, but rather of the heat absorbing capacity of the arc extinguishing liquid.

Arc extinguishing devices, according to the present invention, are capable of interrupting high-voltage circuits with much smaller arc chambers and with a much less gas evolution than has heretofore been thought possible. These advantages arise from the fact that the extinguishing device possesses a very high arc interruption capacity per unit length, and is capable of effecting the opening of the controlled circuit within the first cycle of operation. Another advantage of our invention resides in the fact that in comparison to the well known circuit interrupting devices very small quantities of arc extinguishing medium need be supplied during its operation. In addition, the work expended in effecting the delivery of the arc extinguishing medium is likewise small, which fact may be attributed to the high efficiency with which the heat capacity of the liquid is utilized. Furthermore, it is not necessary to utilize insulating liquids which possess the undesirable property of inflammability with the devices of our invention. And lastly, our invention makes possible a structure which is very simple in construction, which may be operated with comparatively low-pressure supplies of gas, and which, being open to the atmosphere during its operation, is substantially explosion-proof.

The improved operation of our invention results from the fact that devices embodying our invention produce a particularly high-temperature gradient between the arc and the external surrounding fluid, and that the minimum arc diameter for any particular value of arc current is assured. This small arc diameter and high-temperature gradient is brought about by means which causes the heated vapor and gas, produced in the immediate neighborhood of the arc stream, to be constantly carried away and replaced with fresh cool liquid. Specifically, this means comprises, as mentioned above, a surrounding sleeve or jacket of flowing liquid, under pressure, which intimately contacts and surrounds the arc for a given length, and which flows along the arc stream throughout its entire axial length, the flowing stream of arc extinguishing fluid venting through openings disposed at the ends of the arc passage. This surrounding jacket of liquid consists of an outer sleeve of liquid, an inner sleeve formed by the arc gases, and a thin vapor jacket intermediate the outer and inner sleeves. By continuously replacing the highly heated gases in the immediate neighborhood of the arc stream by a cooling means of high heat absorbing capacity per unit volume, the physical dimensions of the arc stream will be minimized in cross-section, and when the current passes the zero value, the arc will become incapable of reigniting itself, and will thereby be extinguished. Since all of the gases and the vapor produced by the heat of the arc are continuously removed from the arc passage by the flowing stream of liquid, excessive pressures within that passage are prevented and satisfactory operation of the device may be accomplished with fluid pressures of a few atmospheres.

For high voltage circuits of large current capacity, a plurality of arc extinguishing devices, according to our invention, may be connected in series, each of the devices being provided with an arc passage of limited length, this arrangement effecting the extinction of high voltage arcs with a maximum efficiency. As another means of improving the operation of the devices, the arc passage may be provided with radial vent openings intermediate the ends thereof, and the liquid may be supplied to the channel at various points between the vent openings.

The arc extinguishing passage may have a rectangular or elliptical cross-section. In the case of a circular cross-section, it is preferable, for most applications, to make the diameter less than 15 millimeters.

In order that the arc extinguishing liquid shall reach the immediate neighborhood of the arc for the maximum possible length during the passage of the arc current through zero value, we have provided means in the neighborhood of the arc which will act as buffers or energy accumulators, the frequency of these energy accumulating means being preferably approximately two or three times the natural frequency of the arc. Through this means, the flowing stream of liquid is caused to more closely surround the arc and to follow the oscillations of the arc with a minimum time lag, the energy accumulating means having a higher natural frequency of vibration than the arc. An energy accumulating effect may be accomplished by suitable design of the arc passage itself or through the provision of separate means, as will be described in detail later.

Through the provision of an energy storing means, the operation of the extinguishing device may be effected with a much lower pressure than is possible without such an arrangement. In effect, the energy accumulator absorbs the shocks imparted to the liquid flowing through the arc stream due to the variation in cross-sectional area of the arc with the normal alternations of the current wave.

One suitable arrangement resides in the provision of air dashpots or air containing pressure vessels connected to the supply conduit for the pressure liquid, intermediate the arc passage and the main body of arc extinguishing fluid. This means prevents the oscillations in the liquid flowing through the arc passage from being transferred to the main body of the arc extinguishing liquid, and limits them to a relatively small quantity of liquid in the immediate neighborhood of the arc. As an alternative arrangement, the body enclosing the extinguishing chamber may be made of elastic material. Likewise, it is possible to provide suitable gas-filled elastic sleeves or bodies disposed within the arc passage in the neighborhood of the extinguishing chamber. To prevent the arc extinguishing liquid from flowing continuously through the arc extinguishing device, the supply means for the liquid is preferably placed under pressure only during the operation of the switch. The pressure may be produced by the gear or other means which actuates the moving contact or suitable valve means may be provided.

It is also possible to supply pressure which varies periodically with alternating-current wave, this pressure being produced approximately 1-1/1000 of a second before the alternating-current wave reaches the zero value.

The minimum pressure under which the liquid must be placed in the immediate neighborhood of the arc is a function of the dimensions of the arc passage. As pointed out above, too high pressures are undesirable, since they are unnecessary and even dangerous, because the forcing of liquid into the arc extinguishing chamber in such manner that the arc may be extinguished during a maximum value of the current will produce extremely undesirable transient conditions.

In the accompanying drawings, certain embodiments of our invention are shown in diagrammatic form:

Figs. 1, 2, and 3 are views illustrating three successive conditions during the extinction of an arc in a device constructed according to our invention;

Fig. 4 is a curve illustrating the conditions prevailing in the arc extinguishing chamber during the one alternation of the arc current;

Figs. 5 through 10, inclusive, show various modified forms of the arc extinguishing device of our invention;

Figure 12:
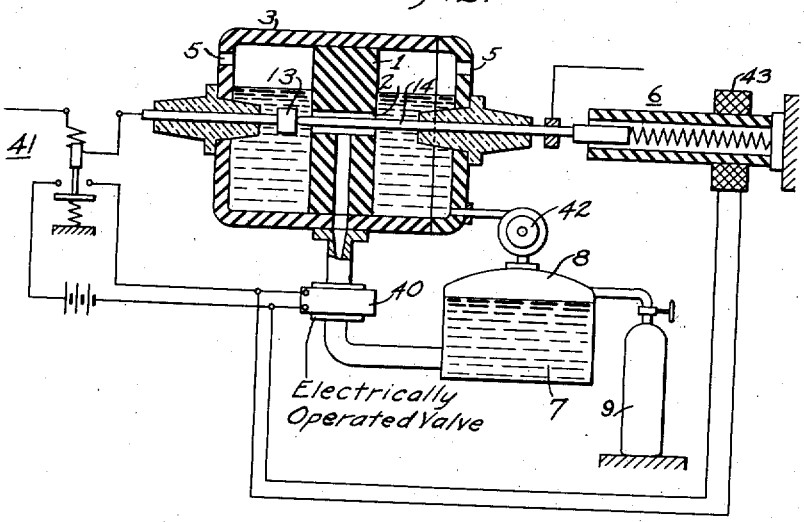
Fig. 12 is a diagrammatic view showing a circuit interrupter embodying the features of our invention.

A circuit interrupter embodying the features of our invention is illustrated diagrammatically in Fig. 12. As shown in that figure, the insulating means 1, which defines the walls of the arc passage 2, is disposed within an outer casing 3, which is of sufficient size that the outflowing gases may freely expand therein during the operation of the device. To further assure that no objectionable back pressures shall be built up within the casing, a plurality of openings 5, leading to the atmosphere are provided. A stationary contact 13 is supported at one end of the casing and is adapted to cooperate with a movable contact 14 which is supported by suitable guide and actuating means 6. The main body of arc extinguishing liquid 7 is contained within a suitable reservoir 8 and the pressure for moving this liquid is supplied thereto from a gas containing pressure cylinder 9. The flow of the arc extinguishing fluid through the passage is controlled by an electrically operated valve 40 which is operable in response to an overload relay 41 which controls the operation of the movable contact member or to other means, as may be desired. A pump means 42 may be provided for returning the arc extinguishing fluid to the main reservoir following each operation of the interrupter.

During the circuit opening operation of this device, the coil 43 forming a part of the actuating means 6 for the movable contact is energized and causes the movable contact rod 14 to be moved through the arc passage 2 formed within the arc extinguishing chamber. At the same time the arc extinguishing fluid begins to flow through the arc passage to effect the extinguishment of the arc when drawn therein. The particular form of the circuit interrupter is not an important part of this invention, which is more particularly concerned with improving the operation of the arc extinguishing device utilized therewith, and any suitable structure may be employed.

Figure 1:
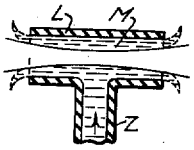
Figure 2:
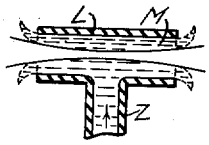
Figure 3:
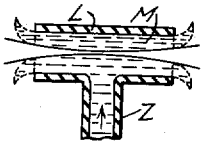

In Figs. 1 to 3, the circuit interrupter is shown as including tubular means L for defining the walls of an arc passage wherein the arc is drawn in an axial direction, both ends of the passage opening into a suitable expansion space. The conduit Z is provided for supplying the arc extinguishing liquid to the interior of the passage defining means L at the central portion thereof. Three successive steps in the arc extinguishing operation are shown. The difference of time between the step shown in Figs. 1 and 2 and between that shown in Figs. 2 and 3 amounting to about .0005 second. The difference in time between Figs. 1 and 3 totals, therefore, .001 second. Fig. 3 represents the arc at the time when the alternating current passes through a zero value and the other figures show the arc shortly before the current reaches the zero value. The current magnitude of the arc might be 3000 amperes in Fig. 1, 1500 amperes in Fig. 2, and 0 in Fig. 3, assuming an alternating current of 50 cycles.

Shortly before the arc is drawn through the arc passage, which is defined by the member L, a quantity of arc extinguishing liquid is forced into that passage through the supply conduit Z. The arc is, therefore, surrounded by a cylindrical jacket M of arc extinguishing liquid which is under a suitable pressure immediately upon its formation. The arc evaporates the layer of liquid immediately adjacent thereto, and as a result forms a vapor jacket around itself, which partially insulates the liquid from the arc. The entire fluid column, however, together with the vapor jacket is caused to flow rapidly in the axial direction of the arc passage because of the great difference in pressure prevailing between the central portion of the arc passage and the open ends thereof. The flowing liquid, thus replaces the escaping gases so that with the decreasing gas generation accompanying the normal decrease in current magnitude of the arc, the liquid channel M surrounding the arc increases in cross-section. The arc extinguishing liquid is under such a pressure and is admitted to the arc passage under such a large conduit that the complete filling of the arc extinguishing passage is assured at all times.

To assure absolute freedom of movement of the arc extinguishing fluid through the arc passage, it is essential that the open ends shall be free of any restriction and an adequate supply of arc extinguishing fluid under a suitable pressure shall be available throughout the entire circuit opening operation.

In Fig. 2, the arc passage is substantially filled with liquid, and in Fig. 3, the arc has shrunk to a small liquid channel. At this time, the portion of the arc stream in the arc passage has a very high temperature gradient, and since a large quantity of liquid with a very high heat absorbing capacity is being moved through the arc passage, the temperature of that remaining portion of the arc stream drops very considerably within the short interval of time (which amounts to about .0001 to .00001 second), when the current passes through the zero value and before the restored voltage reaches a sufficient magnitude to cause the restriking of the arc. The arc, therefore, does not reignite itself in the arc passage, provided, of course, that the fluid column therein is sufficiently insulating to withstand the circuit voltage.

Figure 4:
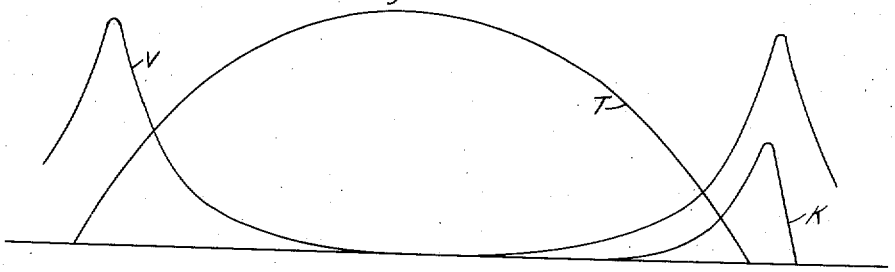

The conditions prevailing in the arc extinguishing chamber during one alternation of the supply current are illustrated in Fig. 4. The curve T denotes a half wave of the alternating current; the curve V the velocity of flow of arc extinguishing liquid through the arc passage; the curve K and the force which must be available for accelerating the fluid supply in order that the arc passage may be entirely filled with liquid during the arc extinguishing operation. The pressure force to be applied to the liquid is, of course, a function of this accelerating force.

During tests of our invention, an arc of 8,000 amperes at an operating voltage of 15,000 volts was extinguished within an arc passage having a length of 49 millimeters at the first zero value in current wave, the arc passage being vented to the atmosphere at either end and water, at a pressure of 10 atmospheres, being utilized as the arc extinguishing fluid. The insulation of the arc passage was found to be capable of withstanding 3,000 volts per centimeter of length immediately following the first zero point in the wave, which value is much higher than can be obtained in the devices heretofore known in the art.

Figure 5:
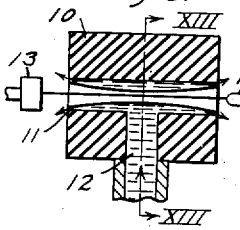
Figure 6:
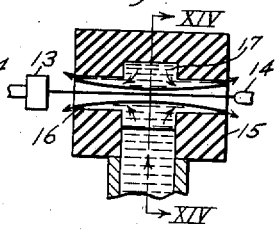
Figure 7:
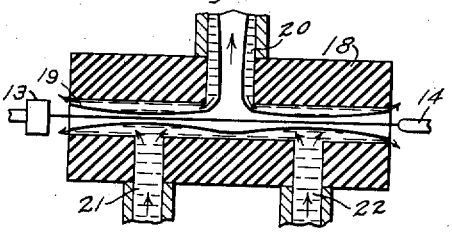
Figure 13:
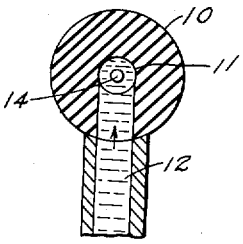
Fig. 13 is a sectional view on the line XIII—XIII of Fig. 5.

Figs. 5 to 7 show various modified forms of an arc extinguishing chamber and of the supply means for introducing a liquid into that chamber during the operation of the switch. In the device shown in Figs. 5 and 13, the arc passage 11 comprises a cylindrical opening formed within a suitable wall member 10 of insulating material A supply channel 12 disposed perpendicularly to the axis of the arc passage is provided for admitting the arc extinguishing fluid. A fixed contact 13 is arranged at one side of the device and a moving contact 14, which is drawn through the arc passage during the operation of the device, is provided for cooperating therewith. The arc passage 11 is filled with arc extinguishing fluid which flows through the channel 12, immediately upon the initiation of a circuit opening movement, and the extinction proceeds exactly as described above. Fig. 5 illustrates the manner in which the gas evolved by the heat of the arc causes the arc stream to increase from the center toward the outer ends thereof.

Figure 14:
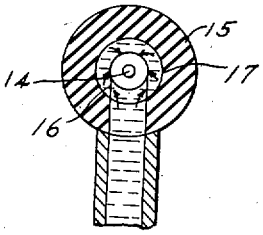
Fig. 14 is a sectional view on the line XIV—XIV of Fig. 6.
Figure 15:
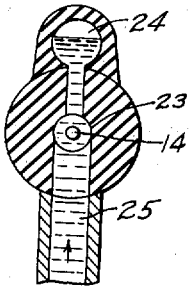
Fig. 15 is a sectional view on the line XV—XV of Fig. 8.

The arc chamber shown in Figs. 6 and 14 is substantially similar to that shown in Fig. 5, except that an annular passage 17 surrounds the arc passage 16, which is formed within the wall defining insulating body 15. Through this arrangement, a more even in-flow of the arc extinguishing fluid is accomplished.

A further modification is illustrated in Fig. 7 wherein a cylindrical arc passage 19 is formed within an insulating body 18 and is provided with a radial relief opening 20 and a pair of supply channels 21 and 22. In this embodiment, the usual decreased efficiency of a relatively long arc extinguishing passage is obviated, since the passage is divided by the relief opening into two shorter passages, each of which is in effect opened at both ends. By this means, two restricted portions of the arc stream are made possible.

Figure 8:
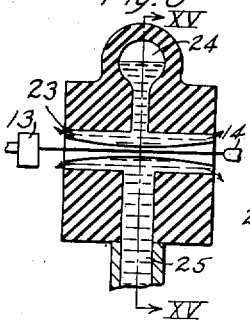
Figure 9:
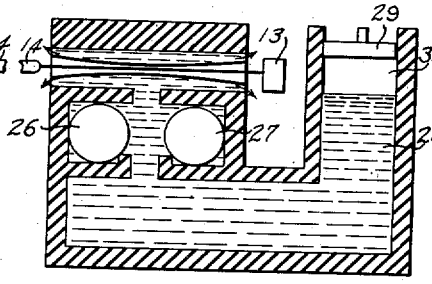
Figure 10:
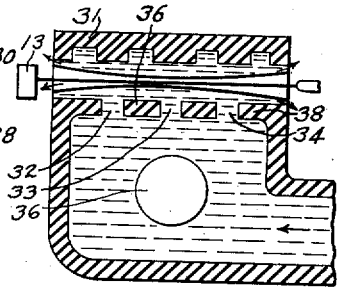

In Figs. 8 to 10, we have shown certain devices which are provided with energy storing means for assuring a continuous flow of arc extinguishing liquid into the arc passage during the circuit opening operation. As pointed out above, this arrangement makes possible the use of lesser pressures in the supply means for the arc extinguishing fluid and increases the reliability of operation of the device. The structure shown in Figs. 8 and 14 comprises an air vessel 24, which is connected to the arc passage by a suitable conduit. This vessel acts similarly to any of the other well known energy storing arrangements.

Figure 11:
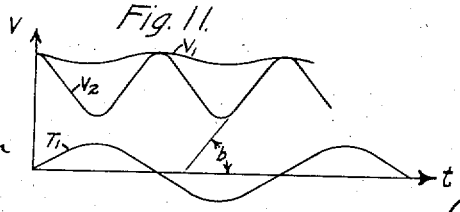
Fig. 11 is a curve showing the variation of pressure within a device utilizing an energy accumulating device and in a device wherein such a device is not utilized.

Fig. 11 shows the effect of the energy storing means time plotted on the horizontal axis. The curve $T_1$ represents the arc current, the curve $V_1$ the velocity of the flow of the liquid in the arc passage without the energy storing buffer device, and the curve $V_2$ the velocity of flow of the liquid with the buffer device. The accelerating force to be applied to the liquid is proportional to the tangent of the angle B. As will be apparent, the pressure producing force may be reduced by the provision of a properly designed energy storing buffer means.

Fig. 9 illustrates another embodiment. The variations of pressure in the neighborhood of the arc passage are absorbed by gas-filled elastic bodies 26 and 27 arranged in the supply conduit for the arc extinguishing medium, and the pressure in the liquid is produced by forcing downwardly a piston 29 which entraps a quantity of gas in the space 30 between the surface of the liquid and the piston. Instead of compressing the gas by forcing downwardly by moving a piston, the chamber may be connected with a pressure source, such as illustrated in Fig. 12, the valve 40 controlling the force of pressure being opened upon the interruption of the switch. The gas-filled elastic bodies 26 and 27 are compressed when the current magnitude of the arc is high and expand as the current magnitude decreases to the zero value.

The arc extinguishing device shown in Fig. 10 is provided with a particularly large cross-sectional area supply means. The arc passage is formed within an insulating body 31 which is connected with the liquid chamber 55 through various supply openings 32, 33 and 34, which are so arranged that, at one side only the walls 35, 36, 37 and 38 remain, and the channel is divided into a plurality of single sections. An elastic cushion means 56, which serves as the energy storing buffer, and which may take the form of a rubber balloon or similar device, is disposed within the pressure chamber 55. The liquid enters the pressure chamber 55 and through it and the arc passage from an external supply source, the direction of flow being indicated by the arrow 57. The large cross-sectional area of the supply source aids in minimizing the pressure which must be supplied to the liquid by reducing the fluid friction.

The arc extinguishing devices as shown in Figs. 5 through 10 may be arranged in a liquid container as in such manner that the surface of the liquid contained therein lies somewhat above the upper edge of the arc passage. For example, the container 3 of Fig. 12 may be filled with liquid to the level indicated at 58. The arc extinguishing passage is then completely filled with liquid at all times and during the circuit opening operation it is necessary merely to provide a pressure for moving the liquid through the passage. It is also possible to accomplish our invention wherein the arc passage is opened at only one end.

We claim as our invention:

1. In a circuit interrupter for use with alternating current circuits, means for defining the walls of a tubular arc passage having a length at least several times its greatest cross sectional dimension, means for establishing the arc incident to the opening of said interrupter longitudinally within said arc passage, a body of arc extinguishing liquid, and means operable during each circuit opening operation of said interrupter to move a quantity of said liquid which has not been subjected to the arc into said arc passage, said liquid being introduced into said passage under sufficient pressure, with respect to the dimensions of said passage, to cause at least a portion of said arc to be surrounded by a flowing stream of fresh, unionized, arc extinguishing liquid which intimately contacts said arc at all times during the entire circuit opening operation, despite the variations in cross sectional area of the arc which accompany the normal fluctuations in the arc current.

2. In a circuit interrupter for use with alternating current circuits, means for defining the walls of a tubular arc passage having a length at least several times its greatest cross sectional dimension, means for establishing the arc incident to the opening of said interrupter longitudinally of said passage, a body of arc extinguishing liquid, and means, including a conduit which connects with said passage intermediate its ends, operable during and only during each circuit opening operation of said interrupter to move a quantity of liquid which has not been subjected to the arc into said passage, said arc passage being open at either end and except for said conduit means being otherwise completely enclosed, said quantity of liquid being moved into said arc passage under sufficient pressure to cause said arc to be surrounded by a flowing stream of fresh, unionized, arc extinguishing liquid which is in intimate contact therewith throughout each circuit opening operation, the dimensions of said passage and the pressure at which said liquid is introduced therein being so correlated that said flowing stream of liquid follows the normal variations in the dimensions of said arc resulting from the normal fluctuations in the magnitude of the arc current.

3. In a circuit interrupter for use with alternating current circuits; solid means for defining the walls of a substantially cylindrical arc passage having a length at least several times its cross-sectional diameter; means for establishing the arc incident to the opening of said interrupter within said arc passage, the cross sectional area of said arc passage being not more than slightly greater than the maximum cross sectional area of the largest current magnitude arc which may be drawn therein during the operation of said interrupter; a body of arc extinguishing liquid; means, including a conduit which connects with said passage intermediate its ends, operable during each circuit opening operation of said interrupter to cause a quantity of said liquid to be moved into said arc passage without substantial heating or ionization thereof; said quantity of liquid being under sufficient pressure to cause at least a portion of said arc to be surrounded by a flowing stream of fresh, unionized, arc extinguishing liquid; said arc passage being open at either end and except for said conduit means being otherwise completely enclosed; and energy storage means sufficiently low inherent inertia to prevent the normal fluctuations in the physical dimensions of the arc, due to normal variations in the current wave, from causing excessive fluctuations in the pressure within said arc passage, in order that said flowing stream shall intimately contact said arc at all times during the operation of said interrupter.

4. In a circuit interrupter, means for defining the walls of a tubular arc passage having a length at least several times its greatest cross-sectional dimensions, means for establishing the arc incident to the opening of said interrupter within said arc passage, a body of arc extinguishing liquid, means, including a conduit which connects with said arc passage intermediate its ends, operable during each circuit opening operation of said interrupter to move a quantity of said liquid into and through said arc passage to extinguish said arc, said quantity of liquid being moved into said arc passage under sufficient pressure to cause at least a portion of said arc to be surrounded by a flowing stream of said liquid which is at all times in intimate contact therewith, and energy storage means, comprising a substantially closed chamber wherein a predetermined quantity of gas is permanently entrapped and means for connecting said chamber into pressure responsive relationship with said arc passage, for preventing the normal fluctuations in the magnitude of the arc current from causing sufficient fluctuation in the pressure in said passage to permit said intimate contact between said arc and said liquid to be broken, said arc passage being open at at least one of the ends thereof and except for said conduit means and said means for connecting said gas containing pressure chamber into pressure responsive relationship therewith being otherwise substantially completely enclosed, the physical dimensions of said arc passage, the pressure at which said liquid is introduced thereinto, and the characteristics of said energy storage means being so correlated that the natural frequency of oscillation of said energy storage means is at all times not substantially less than twice the period of the alternating current circuit with which the interrupter is used.

5. A circuit interrupter comprising means defining an arc chamber, a pair of separable contacts at least one of which is movable through said chamber for establishing an arc therein, an arc extinguishing liquid within said chamber, said chamber having passages leading therefrom arranged so that arc extinguishing liquid is caused to flow through said passages longitudinally of the arc path, and means for supplying to said chamber upon opening of the circuit additional arc extinguishing liquid under a pressure sufficient for maintaining a quantity of liquid which has not been subjected to the arc in intimate contact with the arc but without destroying the continuity of the arc during the interruption of the circuit irrespective of variation in the cross sectional area of the arc resulting from fluctuations in the arc current.

6. A liquid immersed circuit interrupter comprising a pair of separable contacts, means defining an arc chamber and within which arc pressure is generated upon opening of the circuit, passages leading from said chamber, and means for directing into the arc chamber through at least one of said passages additional liquid under pressure from a source independent of said arc pressure in accordance with the circuit opening operation, at least one of the remaining passages serving to discharge gas and liquid from said arc chamber, said pressure from said independent source being sufficient in magnitude to counteract the internal pressure of the arc and maintain a flow of additional liquid longitudinally of the arc through said passages and in intimate contact with the arc at all times despite variations in the cross sectional area of the arc and without breaking the continuity of the arc.

7. In a circuit interrupter, means defining an arc chamber, arc extinguishing liquid within said arc chamber, means for establishing an arc within said arc chamber, means for injecting additional arc extinguishing liquid into said chamber in accordance with the circuit opening operation, and means for venting said chamber to cause arc extinguishing liquid and the products of decomposition of the arc to flow longitudinally of the arc in escaping from said chamber, said injecting means maintaining said liquid within said chamber at a pressure sufficient to cause an intimate engagement of the liquid with the arc at all times irrespective of variations in the cross-sectional area of the arc without causing a substantial penetration of the liquid into the arc.

8. In a circuit interrupter, means defining an elongated arc chamber, arc extinguishing liquid within said chamber, a contact structure for drawing a relatively long arc within said arc chamber, means for injecting additional arc extinguishing liquid into said chamber at a plurality of points longitudinally of the arc path and passages leading from said arc chamber for the escape of arc extinguishing liquids and the products of decomposition of the arc, said injecting means cooperating with said pasasges to subject a plurality of separate sections of the arc to a separate longitudinal flow of arc extinguishing liquid and to maintain said liquid in intimate contact with the respective arc sections despite variations in the cross-sectional area of said sections but without injecting said liquid into said arc during the circuit interrupting operation.

9. In a circuit interrupter, means defining an elongated arc chamber, a contact structure for establishing a relatively long arc within said arc chamber, vent passages leading from said arc chamber and means for injecting arc extinguishing liquid into said chamber at a plurality of points longitudinally of the arc path in accordance with movement of said contact structure to open circuit position and at a pressure to maintain the arc chamber filled at all times during the circuit opening operation, said injecting means cooperating with said passages to subject a plurality of longitudinally spaced sections of said arc to a separate longitudinal flow of arc extinguishing liquid and to maintain said arc extinguishing liquid in intimate engagement with said arc sections irrespective of variations in the cross-sectional areas of said arc sections without causing substantial penetration of said arc extinguishing liquid into the arc sections.

10. The method of interrupting an electrical circuit which comprises establishing an arc within a quantity of liquid, moving an additional quantity of liquid longitudinally of the arc to remove the products of decomposition of the arc and maintaining the moving liquid under sufficient pressure to cause said liquid to intimately engage said arc without substantial penetration thereinto during variations in the cross-sectional area thereof due to normal fluctuations of the arc current.

11. The method of interrupting an electric circuit which comprises establishing an arc, subjecting said arc to the longitudinal flow of said liquid and maintaining the flowing liquid under sufficient pressure to cause said liquid to intimately contact the arc at all times but without breaking the continuity of the arc during circuit interruption irrespective of the variations in the cross-sectional area of the arc resulting from the normal fluctuations in arc current.

12. The method of interrupting an electrical circuit which comprises establishing an arc within a liquid, subjecting said arc to a longitudinal flow of said liquid which has not been subjected to the arc and maintaining the flowing liquid under sufficient pressure to expel the products of decomposition of the arc longitudinally of the arc and cause the flowing liquid to intimately engage the arc without substantial penetration thereinto despite the variations in the cross-sectional area of the arc accompanying the normal fluctuations in arc current.

13. The method of interrupting an electrical circuit which comprises establishing a relatively long arc, subjecting a plurality of longitudinally spaced sections of the arc to a separate longitudinal flow of liquid and maintaining the liquid flowing longitudinally of each section under sufficient pressure to cause said liquid to intimately contact the respective sections of the arc without substantial penetration into the sections irrespective of the variations in cross-sectional area of the arc sections resulting from the normal fluctuations in arc current.

14. In a circuit interrupter, means defining an arc passage, arc extinguishing liquid within said arc passage, means for establishing an arc within said arc passage, means for moving arc extinguishing liquid through said arc passage in accordance with the circuit opening operation, and means for venting said arc passage to cause arc extinguishing liquid and the products of decomposition of the arc to flow longitudinally of the arc in escaping from said arc passage, said liquid moving means maintaining liquid within said arc passage at a pressure sufficient to cause an intimate engagement of the liquid with the arc at all times irrespective of variations in the cross-sectional area of the arc without destroying the continuity of the arc.

15. In a circuit interrupter, means of insulating material defining an elongated arc passage open at least at one end, arc extinguishing liquid within said arc passage, means for establishing an arc longitudinally of said arc passage, and means for moving arc extinguishing liquid longitudinally of the arc in accordance with the circuit opening operation, said liquid moving means subjecting substantially the entire length of said arc to an enveloping stream of arc extinguishing liquid and maintaining said enveloping liquid at a pressure sufficient to squeeze out substantially all arc gases through the open end of said arc passage but without injecting a sufficient quantity of arc extinguishing liquid into the arc to break the continuity of the arc during the normal cyclic variations thereof.

FRITZ KESSELRING.
FLORIS KOPPELMANN.
WERNER KAUFMANN.